United States Patent [19]

Gautier et al.

[11] Patent Number: 4,606,840

[45] Date of Patent: Aug. 19, 1986

[54] AQUEOUS COMPOSITION FOR THE DISPERSION OF HYDROPHOBIC SUBSTANCES, PARTICULARLY APPLICABLE TO THE CLEANING OF OBJECTS SOILED BY PAINT OR THE LIKE

[75] Inventors: Jean-Claude Gautier, Billere; François Lanore, La Varenne St.-Hilaire, both of France

[73] Assignee: Societe Nationale Elf Aquitaine, France

[21] Appl. No.: 650,365

[22] Filed: Sep. 13, 1984

[30] Foreign Application Priority Data

Sep. 13, 1983 [FR] France ............................. 83 14529

[51] Int. Cl.⁴ .................... C09D 9/04; C11D 7/50; B01J 13/00
[52] U.S. Cl. .................................. 252/171; 134/38; 252/170; 252/312; 252/550; 252/558; 252/559; 252/610; 252/DIG. 8; 514/941; 514/942
[58] Field of Search ................ 252/8.55 D, 312, 170, 252/DIG. 8, 171, 550, 558

[56] References Cited

U.S. PATENT DOCUMENTS

| | | | |
|---|---|---|---|
| 1,884,773 | 10/1932 | Lougovoy | 252/DIG. 8 |
| 2,140,519 | 12/1938 | Elston | 252/312 |
| 2,697,674 | 12/1954 | Eisen | 252/312 X |
| 2,721,848 | 10/1955 | Vitalis | 252/DIG. 8 |
| 3,976,582 | 8/1976 | Douglas et al. | 252/312 X |
| 4,022,699 | 5/1977 | Holm | 252/8.55 D |

*Primary Examiner*—Richard D. Lovering
*Attorney, Agent, or Firm*—Ostrolenk, Faber, Gerb & Soffen

[57] ABSTRACT

Aqueous composition for the dispersion of hydrophobic substances, constituted by a microemulsion of one or more hydrocarbons, ketones and alcohols and/or glycol ethers or esters in the presence of a surfactant compound, in water, characterized in that the water has a pH of 8 to 14 and that the molar ratio of the carbonyl groups (—CO—) present to the hydrocarbon is from 0.2 to 1.

Application of this composition to the removal of various paints, in particular to washing brushes; washing can be finished with water.

15 Claims, No Drawings

AQUEOUS COMPOSITION FOR THE DISPERSION OF HYDROPHOBIC SUBSTANCES, PARTICULARLY APPLICABLE TO THE CLEANING OF OBJECTS SOILED BY PAINT OR THE LIKE

The present invention relates to an improved aqueous composition for the dispersion of various hydrophobic substances; it consists more particularly of transparent aqueous mixtures containing several organic solvents. These compositions are useful for the aqueous dispersion of solids insoluble in water, such as tars, asphalts, mineral or vegetable oils, resins, varnishes and various polymers utilized in paints or coating compositions etc. The composition according to the invention is particularly applicable to the dilution of various suspensions or solutions, such as paints, coatings, fireproofing agents, insecticidal or cryptogamic products and others. It also allows the cleaning of all kinds of objects or surfaces soiled by the hydrophobic substances mentioned above; thus, it can be employed for cleaning surfaces of concrete, walls, roofs, metal parts such as railways and others. The new composition has considerable advantages for removing paints or varnishes from various surfaces and for washing brushes which have been used for the application of paints, varnishes and other coatings.

The uses indicated above represent operations which are often important in industry, where dilution and the cleaning of vessels, surfaces and tools take place almost daily. Also, various formulations of solvents have been proposed for use in such cases. The use of organic solvents alone, which has been practised for a long time, is very costly, generally presents pollution disadvantages and the efficacy is not always sufficient. Attempts have thus been made to provide aqueous compositions containing surfactant agents; however, as these require the presence of solvents to detach the hydrophobic products from their supports, use has been made of aqueous mixtures containing various organic solvents, such as esters, ketones, ethers, alcohols, chlorinated solvents etc. Thus for example, according to Belgian Pat. No. 874820, for cleaning brushes, use is made of a mixture containing xylene, isobutanol, ethylene glycol and an emulsifier, in the presence of a small proportion of water. According to Belgian Pat. No. 821886, a paint remover allowing subsequent washing with water contains alkoxyalkanols and alkoxyalkanolic esters. Another example of paint remover compositions is given in U.S. Pat. No. 3,702,304, where an aqueous emulsion of xylene, dimethylformamide, dichloromethane and polyethyleneglycol is proposed. Each of these compositions of the prior art has its sphere of application, but none is of general use; it therefore results that certain cleanings or dilutions are difficult, because the hydrophobic substance emulsified at the beginning reprecipitates when washing with water is carried out.

A certain advance in this field has been realised by compositions which contain a chlorinated hydrocarbon, a ketone and an alcohol, including at the same time a suitable emulsifying agent, generally a sulphonate derived from fatty alcohols. This composition, according to U.S. Pat. No. 3,737,386, can be diluted with water and it allows washings in numerous cases where it is necessary to eliminate tars, greases, resins, certain paints and varnishes. However, the efficacy of this mixture is still not sufficient, because—in many cases—the hydrophobic material reprecipitates when the washing is finished off with water; moreover, the compositions themselves are not very stable and their components precipitate, particularly at slightly elevated temperatures during dilution with water.

The present invention provides an improvement in that it provides compositions applicable over a much greater range of cases than in the past of hydrophobic materials to be diluted or removed; it also has the advantage of employing very stable compositions, at least at temperatures ranging from 0° to 70° C., which can be diluted practically without precipitation of their constituents, in any proportion with water.

The composition according to the invention is constituted by a microemulsion comprising a high proportion of water and at least three types of organic solvents, namely, hydrocarbons, ketones, alcohols or glycol ethers or esters and a surfactant agent capable of producing a microemulsion of the hydrocarbon present. In other words, the new compositions are liquids in which the droplets of the hydrocarbon have a size below 0.4 micron and are completely stable at ambient temperatures; their advantage is to be dilutable infinitely with water.

These new compositions are characterized in that the water which they contain is alkaline, having a pH of 8 to 14 and preferably from 10 to 13.5.

Another important characteristic of these compositions is that the molar ratio of the carbonyl groups (—CO—) present to the hydrocarbon is in the range from 0.2 to 1. Preferably, the CO/hydrocarbon ratio is from 0.25 to 0.9.

The carbonyl groups can be carried by various ketones, preferably from $C_3$ to $C_{12}$ and if required those carrying other groups, for example ester, halogen or second carbonyl. Thus use can be made of acetone, methyl-ethyl ketone, diethyl ketone, methyl-propyl ketone, methyl-butyl ketone, ethyl-butyl ketone, acetonyl-acetone, acetyl-acetone, acetoxy-acetone, chloroacetone, methyl- or ethyl-chlorobutyl ketone, methyl-isobutyl ketone, diacetone-alcohol etc.

As regards the hydrocarbons, use can be made of those of the known art, for example aliphatic, aromatic or naphthenic, preferably having a number of carbons not exceeding 12. Particularly suitable are hydrocarbons such as pentane, hexane, heptane, octane, decane, dodecane, separately or in industrial mixtures such as petroleum ether, white spirit etc. Also, use can be made of benzene, toluene or xylene or their mono- or dichlorinated derivatives, if required in admixture in any other liquid. Cyclohexane and cylopentane are also suitable. A very recommendable class of hydrocarbons comprises those which are called chlorinated solvents, that is to say principally the mono-, di- and trichloroalkanes or alkenes ranging from $C_1$ to $C_4$; such solvents are, for example trichloroethylene, monochloromethane, dichloromethane, trichloromethane, carbon-tetrachloride, 1,1- and 1,2-dichloroethanes, 1,1,1- or 1,1,2-trichloroethane, 1,2-dichloropropane etc.

The alcohols utilizable in carrying out the invention are generally the alcohols from $C_1$ to $C_8$ and above all from $C_1$ to $C_4$, in particular methanol, ethanol, isopropanol, the first being the most economical. Use can also be made of polyols, particularly glycols such as ethylene-glycol, diethylene-glycol, propylene-glycol and their etherified and/or esterified derivatives, i.e. the butyl-ether of ethylene-glycol, ethyl-ether of ethylene-glycol, dimethyl-ether of ethylene-glycol, methyl-ether of propylene-glycol, ethyl-glycol-acetate, butyl-glycol-acetate, without this list being limitative. In a general manner, compounds having hydroxyl groups, necessary in the compositions according to the invention, are selected from those which constitute co-surfactants used in the preparation of microemulsions of water with oils.

For preparation of the microemulsion according to the invention, use can be made of any surfactant agent known for its use for this purpose. Particularly suitable are anionic agents, if required in association with non-ionic. Particularly utilizable are petroleum sulphonates, alkyl-aryl sulphonates, such as for example alkyl-benzene-sulphonates or the ortho-xylene-sulphonates; other advantageous surfactants are the alkyl-sulphates, the alkyl-ether-sulphates, these surfactant salts being formed with cations of the alkali and alkaline earth metals, ammonium or nitrogen bases. Commercially, the sodium salts are of greatest interest.

Water, forming part of the microemulsions in question, is generally rendered alkaline by means of any appropriate base, caustic soda, sodium carbonate or potash being the most economical. This water generally contains 0.1 to 5 g of NaOH per liter or an equivalent quantity of any other base or various salts such as NaCl, $Na_2SO_4$ etc.

As explained above, the principal characteristics of the compositions of the invention are: alkalinity of the water which they contain and a well-determined molar ratio, namely from 0.2 to 1.0, of the quantity of carbonyl groups, that is the number of moles of ketones, and the number of hydrocarbon molecules utilized. However, other quantitative conditions must also be satisfied: thus the ratio OH/hydrocarbon (that is, the moles of alcohol/moles of hydrocarbon) should be from 0.3 to 2.5 and preferably between 0.45 and 2.

Also, in order that the microemulsion will be stable at normal temperatures of use and can be diluted with water without separation of any phase, the molar proportion of the surfactants employed with respect to that of the ketones should be from 0.1 to 0.6, the ratio preferably being from 0.15 to 0.19, the weight ratio of surfactant to co-surfactant being from 0.5 to 2.7 and preferably from 0.8 to 2.2.

It can be seen that the invention resides in the determination of certain quite narrow limits of the molar ratios, for which—in a highly unexpected way—it is possible to obtain stable microemulsions which can be freely diluted with water.

From the standpoint of their composition by weight, the microemulsions according to the invention generally contain:

15 to 30% by weight of hydrocarbon
4 to 15% by weight of ketone
6 to 15% by weight of alcohol or glycols or derivatives
6 to 16% by weight of surfactant The preferred proportions of the non-aqueous components are:

hydrocarbon: 17 to 25% by weight
ketone: 6 to 12.5% by weight
alcohol: 7 to 15% by weight
surfactant agent: 8 to 15% by weight, the remainder being constituted by alkaline water. It will be understood that each of these types of constituents can in reality comprise one or more compounds. If the water present is removed, the compositions according to the invention can appear similar to those of U.S. Pat. No. 3,737,386 which discloses mixed compounds of 10 to 25% by weight of hydrocarbon
25 to 40% by weight of ketone
40 to 50% by weight of alcohol
1 to 10% by weight of surfactant.

As can be seen, the limiting weight ratios according to the U.S. patent are quite different from those of the compositions according to the invention. The ratios below result, in fact, from the weight limits mentioned above

|  | US Patent | Present Invention |
|---|---|---|
| ketone/hydrocarbon | 1 to 4 | 0.13 to 1 |
| alcohol or glycol and derivatives/hydrocarbon | 1.6 to 5 | 0.2 to 1 |

Thus, by reducing in a well-defined amount the proportions of the ketone and the alcohol with respect to the hydrocarbon, microemulsions are obtained according to the invention having a stability in a range which is much larger as regards temperatures and dilution with water.

With the proportions indicated in the U.S. patent referring particularly to dichloromethane and trichloroethylene, as the hydrocarbon, to methyl-ethyl-ketone and $C_2$ to $C_4$ alcohols, the compositions according to the invention are distinguished clearly from those of the prior art, by their percentage compositions, as is shown by the weight ratios indicated above. However, the properties of a microemulsified mixture according to the invention change when components of different molecular weights are utilized. This is why, according to a particular feature of the invention, the limits of the contents of the hydrocarbon, ketone and alcohol are determined in moles; thus, in contrast to the prior art, it is possible to depart from the weight limits indicated, provided the ratios between the numbers of molecules present are within a certain predetermined range.

It appears from the disclosure of the U.S. patent that the molar ratio of ketone/hydrocarbon is 1.18 to 4.7. It has been seen above that an essential condition of the invention is to maintain this ratio within the limits from 0.2 to 1, in order to have a microemulsion which is stable and dilutable with water without precipitation. On the other hand, according to the U.S. patent, the molar ratio of alcohol/hydrocarbon varies between 2 and 7, while according to the invention this ratio is only from 0.3 to 2.5 and preferably from 0.5 to 2, that is, it is much lower than that of the U.S. patent. It results from the foregoing that the non-aqueous constituents of the composition according to the invention can have variable molecular weights, without compromising the stability of the microemulsion, provided the above-mentioned molar ratios are respected.

The invention is illustrated by the non-limitative examples which follow:

EXAMPLES 1 to 8

Microemulsions have been prepared by mixing the compounds cited below with water rendered alkaline by 0.5 to 2.5 g of NaOH per liter.

The Table below indicates in its upper part the % contents by weight of the constituents of the composition. These constituents are:

Hydrocarbon: mixture of equal weights of trichloroethane Cl₃C—CH₃ (molecular weight 133.4) with dichloromethane Cl₂CH₂ (mol. weight 84.9)

Ketone: methylethyl-ketone CH₃COC₂H₅ (mol. weight 72.1) and/or methyl-isobutyl-ketone CH₃COCH₂(CH₃)₂ (mol. weight 100)

Alcohol: or glycol: methanol CH₃OH (mol. weight 32); ethanol C₂H₅OH (mol. weight 46); diacetone alcohol

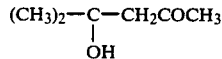

(mol. weight 116); mono-ethyl-ether of ethylene glycol C₂H₅—O—CH₂CH₂OH (mol. weight 90); mono-ethyl-ether acetate of ethylene glycol CH₃—COO—CH₂—CH₂—O—C₂H₅ (mol. weight 132).

Surfactant: mixture of 25% to 50% of sodium lauryl-o-xylene sulphonate with 75% to 50% of sodium tetracosyl-benzene sulphonate, sold commercially under the name SYNACTO (Esso Chemicals). These surfactants are in the form of an oily solution with 60% active materials; these are the quantities alone which figure in the tables of results. These surfactants are accompanied in Examples 6 and 8 respectively with 1.7 and 1.9% by weight of ethoxylated nonyl-phenol which improves the stability to temperature of the microemulsion.

In the upper part of the Table, the examples are numbered in the order of increasing ketone content. In the middle part of the Table, the corresponding molar percentage compositions are given, it being understood that the alkaline water represents the difference to 100.

Finally, at the bottom of the Table are given the molar ratios which provide the good quality of the emulsion.

All the compositions in Examples 1 to 8 are dilutable with water and their better stability is found in the following ranges of temperatures:

| Ex. 1 water in the microemulsion to | 0.5 g/NaOH/l: 0° at above 60° C. |
|---|---|
| 2 water in the microemulsion to | 1 g/NaOH/l: 3° at above 60° C. |
| 3 water in the microemulsion to | 1 g/NaOH/l: 1° at 52° C. |
| 4 water in the microemulsion to | 1.6 g/NaOH/l: 3° at 50° C. |
| 5 water in the microemulsion to | 1 g/NaOH/l: 2° at above 60° C. |
| 6 water in the microemulsion to | 1.3 g/NaOH/l: 1° at above 80° C. |
| 7 water in the microemulsion to | 2 g/NaOH/l: |
| 8 water in the microemulsion to | 1° at 45° C. 2 g/NaOH/l: 3° at above 70° C. |

Each of these microemulsions has been tested for the cleaning of brushes which have been used for various types of paints, oil, acrylic, glycerophthalic, epoxy, polyurethane, emulsion painting: in all cases, it is possible to finish cleaning the brush in water, without any of the attached paint remaining. The compositions of examples 1, 2, 4 and 7 have also been used for cleaning concrete slabs soiled with tar. Good cleaning has been effected, the dispersion of the tar formed being removed with water.

EXAMPLE 9

An analogous composition to that of example 7 is prepared, with the exclusion of the alcohol; it is found that it cannot be diluted with water without separation into two layers.

EXAMPLE 10

The composition of example 7 is modified by increasing to twice the weight content of methyl-ethyl-ketone, that is to 24.4% instead of 12.2%. The molar ratio of ketone/hydrocarbon thus exceeds 1.8 and the composition is unstable and non-dilutable with water above 20° C.

EXAMPLE 11

In the composition of example 6, the 9.2% of methylethyl-ketone is replaced with 12.85% of methyl-isobutyl-ketone (hexanone), the molar ratio of ketone/hydrocarbon thus remaining the same, 0.46. The composition obtained has the same properties.

EXAMPLE 12

With respect to the composition of example 10, the content of hexanone is increased further to arrive at the weight formula:
hydrocarbon: 24.0%
ketone: 17.4%
alcohol: 9.3%
surfactant: 6.0%
water with 2g NaOH/l: 43.3%

Thus, the weight content of ketone exceeds the upper limit of 14% provided above for methyl-ethyl-ketone. Nevertheless, the composition gives results which are as good as those of example 3, because the molar ratio of ketone/hydrocarbon=0.755 still remains well within the limits according to the invention.

TABLE

| EXAMPLE NOS. | 1 | 2 | 3 | 4 | 5 | 6 | 7 | 8 |
|---|---|---|---|---|---|---|---|---|
| | COMPOSITIONS IN PERCENTAGES BY WEIGHT (%) | | | | | | | |
| Hydrocarbons | 20.1 | 20.2 | 21 | 21.5 | 19.6 | 20.4 | 20.8 | 22 |
| Ketones | 6.4 | 8.3 | 8.6 | 8.6 | 8.6 | 9.2 | 12.2 | 13 |
| Alcohols | — | — | — | 8.2 | 12 | — | 13.1 | 6 |
| Glycol ethers or esters | 13.8 | 12.9 | 10.5 | — | — | 13.8 | — | — |
| Surfactants | 13.5 | 14.4 | 12.4 | 12.2 | 13.9 | 15.7 | 12.2 | 12.7 |
| Alkaline water | 46.3 | 44.3 | 47.6 | 49.2 | 46 | 41.3 | 41.7 | 46.1 |
| | CORRESPONDING MOLAR % COMPOSITIONS | | | | | | | |
| Hydrocarbons | 6.6 | 7.1 | 6.75 | 6.5 | 5.9 | 7.2 | 6.5 | 7.1 |
| Ketones | 2.1 | 2.85 | 2.8 | 3.65 | 2.65 | 3.3 | 5.4 | 5.9 |
| Alcohols | — | — | — | 5.1 | 11.6 | — | 13.1 | 3.4 |
| Glycols and derivatives | 5.1 | 4.4 | 3.8 | — | — | 5.5 | — | — |

TABLE-continued

| EXAMPLE NOS. | 1 | 2 | 3 | 4 | 5 | 6 | 7 | 8 |
|---|---|---|---|---|---|---|---|---|
| Surfactants | 1 | 1 | 0.9 | 0.8 | 1 | 1.05 | 0.8 | 0.8 |
| MOLAR RATIOS | | | | | | | | |
| Ketones/hydrocarbons | 0.32 | 0.40 | 0.41 | 0.56 | 0.45 | 0.46 | 0.83 | 0.83 |
| Hydroxyl/hydrocarbons | 0.77 | 0.62 | 0.6 | 0.78 | 2.00 | 0.76 | 2 | 0.48 |
| Surfactant/ketone | 0.48 | 0.35 | 0.32 | 0.22 | 0.38 | 0.32 | 0.15 | 0.14 |
| Surfactant/co-surfactant | 0.98 | 1.11 | 1.18 | 1.48 | 1.16 | 1.14 | 0.93 | 2.11 |

EXAMPLES 13 AND 14

A solvent composition is prepared according to the prior art (FR No. 2486535 page 4, lines 28–38) with Na lauryl-ether sulphate and $C_{12}$ to $C_{14}$ fatty alcohols, known commercially under the name NEOPON LOS/F (WITCO CHEMICAL) as the surfactant agent. This is the composition of example 13.

A similar composition—example 14—is prepared from the same constituents but with a ratio (surfactant agent):(cosurfactant agent) modified according to the invention, in order to form a microemulsion, and with a pH of the water in the range from 8 to 14.

The characteristics of these two examples are as follows.

|  | EXAMPLE 13 | EXAMPLE 14 |
|---|---|---|
| % methylene chloride | 36.0 | 36.0 |
| % diacetone alcohol | 29.5 | 29.5 |
| % isopropyl alcohol | 20.5 | 16.5 |
| % surfactant agent | 8.0 | 12.0 |
| % water | 6.0 | 6.0 |
| ratios: surfactant/ketone | 0.27 | 0.47 |
| ratios: surfactant/alcohol | 0.39 | 0.73 |
| pH of the aqueous phase | 6.5 | 10.5 |
|  | Separation into two layers as soon as the water is added | Dilutable with water in all proportions |

Thus, the composition of the prior art (example 13) has a slightly acid aqueous phase, does not form a microemulsion and cannot have water added without separation into two phases.

In contrast, the modified composition according to the invention (example 14), as regards the proportion of surfactant agent and pH of the water which it contains, is a stable microemulsion to which water can be added as desired, without undergoing separation into two phases.

EXAMPLES 15 AND 16

In an analogous fashion to Examples 13 and 14, a composition according to DE-O-2317135, pages 6 and 7 (example 2) is prepared and also a similar mixture, but modified according to the principles of the invention.

| | Examples | |
|---|---|---|
| | 15 prior art | 16 invention |
| % methylene chloride | 65 | 57 |
| % methyl-propyl-ketone | 19 | 19 |
| % propanol | 12 | 12 |
| % $NH_4$ salt of the sulphuric ester of lauryl alcohol (surfactant) | 4 | 12 |
| Ratios: surfactant/ketone | 0.21 | 0.63 |
| Ratios: surfactant/propanol | 0.33 | 1.00 |
| pH of the aqueous phase | 1.6 | 10.1 |
| | does not accept | miscible |

| | Examples | |
|---|---|---|
| | 15 prior art | 16 invention |
| | water | with water in all proportions. |

The mixture of solvents of example 15, according to the known art, forms two layers as soon as water is added. That of the invention, example 16, gives with water a microemulsion which can be used to clean greasy surfaces.

We claim:

1. An aqueous composition for dispersing hydrophobic substances, which is miscible with water in any proportion without separation and which comprises an aqueous microemulsion containing at least one hydrocarbon or chlorocarbon, ketone, surfactant and cosurfactant, wherein the cosurfactant is selected from the group consisting of liquid mono-alcohols and gylcols and ethers and esters of liquid mono-alcohols and glycols, the molar ratio of carbonyl groups (—CO—) to hydrocarbon molecules is in the range from 0.2 to 1, the weight ratio of the surfactant to the cosurfactant is in the range from 0.5 to 2.6 and the microemulsion has a pH in the range of from 8 to 14.

2. A composition according to claim 1, wherein the ketone contains 3 to 12 carbon atoms and the molar ratio of carbonyl groups to hydrocarbon molecules is in the range from 0.3 to 0.9.

3. A composition according to claim 1 or 2, wherein the microemulsion has a pH in the range from 10 to 13.5.

4. A composition according to claim 3, wherein the weight ratio of the surfactant to the cosurfactant is in the range from 0.8 to 2.2.

5. A composition according to claim 1 wherein the cosurfactant is an alcohol of 1 to 8 carbon atoms and the molar ratio of the alcohol to the hydrocarbon is in the range from 0.3 to 2.5.

6. A composition according to claim 5, wherein the alcohol contains 1 to 4 carbon atoms and the molar ratio of the alcohol to the hydrocarbon is in the range from 0.9 to 2.

7. A composition according to claim 1, wherein the cosurfactant is an ether or ester of a glycol containing 4 to 6 carbon atoms and its molar ratio to the hydrocarbon is in the range from 0.45 to 2.5.

8. A composition according to claim 7, wherein the cosurfactant is ethylene glycol mono-ethyl ether or ethylene glycol monoacetate mono-ethyl ether.

9. A composition according to claim 1, wherein the hydrocarbon is a $C_1$ to $C_4$ alkane or alkene having 1 to 3 chlorine atoms per molecule.

10. A composition according to claim 1, wherein the surfactant is selected from alkylaryl-sulphonates, alkali metal and alkaline earth metal alkyl sulphates and ethoxylated alkyl-phenols.

11. A composition according to claim 10, wherein the surfactant is present in the composition in an amount in the range from 0.1 to 0.6 mole per mole of ketone.

12. A composition according to claim 1, which comprises by weight 15% to 30% of at least one chlorinated $C_1$ to $C_4$ hydrocarbon, 4% to 15% of at least one $C_3$ to $C_{12}$ ketone, 6% to 15% of at least one $C_1$ to $C_8$ alcohol as the cosurfactant and 6% to 16% of surfactant, the balance being water, wherein the molar ratio of the alcohol to the hydrocarbon is in the range from 0.45 to 2.5.

13. An aqueous composition for cleaning objects soiled with hydrophobic substances, the composition being miscible with water in any proportion without separating into distinct phases, which comprises a microemulsion containing by weight 15% to 30% of at least one liquid hydrocarbon or chlorocarbon containing less than 13 carbon atoms, 4% to 15% of at least one $C_3$ to $C_{12}$ ketone, 6% to 15% of at least one cosurfactant selected from the group consisting of $C_1$ to $C_8$ alcohols, glycol ethers and glycol esters, and 6% to 16% of a surfactant, the balance being water having a pH of 8 to 14, wherein the weight ratio of the surfactant to the cosurfactant is in the range from 0.5 to 2.6 and the ketone is present in an amount providing 0.2 to 1 carbonyl group per mole of hydrocarbon.

14. An aqueous composition according to claim 13, comprising by weight 17% to 25% of at least one $C_1$ to $C_4$ chlorinated hydrocarbon, 6% to 12.5% of ketone, 7% to 15% of at least one $C_1$ to $C_4$ alcohol and 8% to 16% of surfactant, the balance being water, wherein the weight ratio of the surfactant to the cosurfactant is in the range from 0.8 to 2.2.

15. An aqueous composition according to claim 14 wherein the alcohol is selected from the group consisting of methanol, ethanol and monoethyl ether of ethylene glycol and the ketone is selected from the group consisting of methyl ethyl ketone, methyl isobutyl ketone and diacetone alcohol.

* * * * *